United States Patent
Duan et al.

(10) Patent No.: US 10,462,842 B2
(45) Date of Patent: Oct. 29, 2019

(54) METHOD AND APPARATUS FOR TRANSMITTING S1AP SIGNALING

(71) Applicant: DATANG MOBILE COMMUNICATIONS EQUIPMENT CO.,LTD., Beijing (CN)

(72) Inventors: Jianghai Duan, Beijing (CN); Zhenduo Zheng, Beijing (CN); Ke He, Beijing (CN); Guodong Ding, Beijing (CN); Lifang Su, Beijing (CN); Zhengkun Zhang, Beijing (CN); Jie Chen, Beijing (CN); Fanyu Wu, Beijing (CN); Jiande Xi, Beijing (CN); Gaoliang Wang, Beijing (CN); Haibo Zhang, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 16/312,292

(22) PCT Filed: Apr. 10, 2017

(86) PCT No.: PCT/CN2017/079933
§ 371 (c)(1),
(2) Date: Dec. 21, 2018

(87) PCT Pub. No.: WO2017/219734
PCT Pub. Date: Dec. 28, 2017

(65) Prior Publication Data
US 2019/0239282 A1    Aug. 1, 2019

(30) Foreign Application Priority Data

Jun. 22, 2016 (CN) .......................... 2016 1 0461474

(51) Int. Cl.
*H04W 80/12* (2009.01)
*H04L 5/00* (2006.01)
(Continued)

(52) U.S. Cl.
CPC .......... *H04W 80/12* (2013.01); *H04L 5/0053* (2013.01); *H04L 65/608* (2013.01);
(Continued)

(58) Field of Classification Search
None
See application file for complete search history.

(56) References Cited

U.S. PATENT DOCUMENTS 8,600,403 B2 * 12/2013 Edge ................... H04W 64/003
455/404.2
9,198,032 B2 * 11/2015 Serravalle ............... H04W 8/26
(Continued)

FOREIGN PATENT DOCUMENTS

CN    101778450 A    7/2010
CN    102300284 A    12/2011
(Continued)

OTHER PUBLICATIONS

3GPP: "3rd Generation Partnership Project;Technical Specification Group Radio Access Network;Home (e) NodeB Network aspects(Release 8)", 3GPP Draft; R3-083410 R3.020 V092 Clean V2, 3rd Generation Partnership Project (3GPP), Mobile Competence Centre ; 650, Route Des Lucioles ; F-06921 Sophia-Antipolis Cedex; France, no. Prague, Czech Republic; Nov. 17, 2008 (Nov. 17, 2008), XP050324621, 67 pages.
(Continued)

*Primary Examiner* — Diane L Lo
(74) *Attorney, Agent, or Firm* — Kilpatrick Townsend & Stockton, LLP

(57) ABSTRACT

Disclosed are an S1AP signaling transmission method and apparatus. The method comprises: an intelligent mobile
(Continued)

edge device receives an SCTP message carrying uplink S1AP signaling of a terminal sent by a Small Cell, determines an operator network corresponding to the terminal according to an S1AP ID carried in the uplink S1AP signaling, and sends the SCTP message carrying the uplink S1AP signaling to the He-GW of the operator network; the intelligent mobile edge device receives an SCTP message carrying downlink S1AP signaling of the terminal sent by the He-GW of the operator network, determines the Small Cell corresponding to the terminal according to an S1AP ID carried in the downlink S1AP signaling, and sends the SCTP message carrying the downlink S1AP signaling to the Small Cell. In this way, a Small Cell may access networks of multiple operators to provide network services for terminals of different operators.

16 Claims, 3 Drawing Sheets

(51) Int. Cl.
*H04L 29/06* (2006.01)
*H04W 88/16* (2009.01)
*H04W 88/18* (2009.01)
*H04W 72/12* (2009.01)
*H04W 76/11* (2018.01)

(52) U.S. Cl.
CPC ........ *H04W 72/1268* (2013.01); *H04W 76/11* (2018.02); *H04W 88/16* (2013.01); *H04W 88/184* (2013.01)

(56) References Cited

U.S. PATENT DOCUMENTS 9,693,205 B2 * 6/2017 Vaidya .................. H04W 68/02
2014/0018083 A1 * 1/2014 Laraqui ............... H04W 84/042
455/446
2015/0109999 A1 * 4/2015 Godin ................... H04W 92/20
370/328
2017/0230817 A1 * 8/2017 Ryu ........................ H04W 8/02

FOREIGN PATENT DOCUMENTS

| CN | 104066133 A | 9/2014 |
| CN | 104469862 A | 3/2015 |
| CN | 105188108 A | 12/2015 |
| CN | 105472695 A | 4/2016 |
| CN | 105636135 A | 6/2016 |
| EP | 3057348 A1 | 8/2016 |
| WO | 2015061978 A1 | 5/2015 |

OTHER PUBLICATIONS

"3rd Generation Partnership Project; Technical Specification Group Radio Access Network; Evolved Universal Terrestrial Radio Access Network (E-UTRAN); Architecture description (Release 13)", 3GPP Standard; 3GPP TS 36.401, 3rd Generation Partnership Project (3GPP), Mobile Competence Centre ; 650, Route Des Lucioles ; F-06921 Sophia-Antipolis Cedex; France, vol. RAN WG3, No. VI3.I.0, Mar. 19, 2016, pp. 1-21, XP051088295.

"3 Generation Partnership Project; Technical Specification Group Radio Access Network; Evolved Universal Terrestrial Radio Access Network (E-UTRAN); S1 Application Protocol (S1AP) (Release 12)", 3GPP Standard ; Technical Specification; 3GPP TS 36.413, 3rd Generation Partnership Project (3GPP), Mobile Competence Centre; 650, Route Des Lucioles ; F-06921 Sophia-Antipolis Cedex ; France, vol. RAN WG3, No. VI2.7.0, Mar. 19, 2016 (Mar. 19, 2016), pp. 1-302, XP051295141.

* cited by examiner

METHOD AND APPARATUS FOR TRANSMITTING S1AP SIGNALING

This application is a National Stage of International Application No. PCT/CN2017/079933, filed Apr. 10, 2017, which claims the benefit of Chinese Patent Application No. 201610461474.5, filed Jun. 22, 2016, both of which are hereby incorporated by reference in their entireties.

FIELD

The present invention relates to the field of communications, and particular to a method and apparatus for transmitting S1AP signaling.

BACKGROUND

As the mobile wideband technologies are advancing dramatically, the amount of data traffic is growing significantly, and there is also an increasing amount of data in various indoor and outdoor hotspot scenarios. A traditional macro cell suffers from a bottleneck of network deployment and coverage, and in order to provide deep network coverage and to improve the capacity of the network while considering a cost factor, operators pay more attention to a small cell.

FIG. 1 illustrates a network architecture of small cells in the prior art, where the small cells access a transmission network, and are connected with a core network, after being aggregated by a switch. The core network includes a Security Gateway (Se-GW), a signaling gateway (He-NB Gateway (He-GW)), an Evolved Packet Core (EPC), and other devices. A Mobile-Edge Computing (MEC) server is connected in series between the small cells and the core network, and accesses local traffic using a Traffic Offload Function (TOF) function.

However in a real application, the small cells are assets of the operators, operate in licensed frequency bands of their operators, and are generally deployed in indoor scenarios, e.g., a supermarket, a museum, an airport, etc. There are certainly users of a plurality of operators in various application scenarios, and in order to provide the users of all the operators with a network service, the different operators set up their own networks respectively and provide their respective users with a network service respectively in a small cell based user access solution in the prior art.

However in this solution, there are a large number of small cell devices belonging to the different operators in the same area. Furthermore as there are more different operators, there are more related devices, and more overlapping networks are set up, so it is more difficult to deploy the devices. This solution also comes with serious interference between the networks, thus degrading the experiences of the users.

In another small cell based user access solution in the prior art, a small cell device is shared, that is, the device is invested and set up by one operator, and leased to another operator while providing its own users with a satisfactory service.

However in this solution, firstly the shared small cell device shall be able to access the core networks of the different operators, so the small cell shall be highly functional; secondly the shared small cell device shall set up Internet Protocol Security (IPSec) tunnels with the security gateway devices of the different operators for the sake of security, and if there are a plurality of such tunnels, then the processing capacity thereof will drop seriously, so that it may not satisfy a normal service usage requirement; thirdly if the users of the operators access the shared small cell device, then the number of small cells deployed in a unit area will increase dramatically, thus making it difficult for the operators to manage and maintain the small cells; and lastly a business mode for sharing and leasing a small cell involves bargaining on and negotiation about a number of items between the operators, so it is difficult to carry out the business mode in practice.

Apparently in the small cell based user access solutions in the prior art, a small cell can only be accessed by a user of an operator thereof, but cannot be accessed by the users of all the operators; and it is difficult to configure a shared small cell to serve the users of all the operators.

SUMMARY

Embodiments of the invention provide a method and apparatus for transmitting S1AP signaling so as to address the problem in the prior art that a small cell can only be accessed by a user of an operator thereof, but cannot be accessed by users of respective operators.

Particular technical solutions according to the embodiments of the invention are as follows.

The embodiments of the invention provide a method for transmitting S1AP signaling, the method including: receiving, by a smart edge device, an SCTP message, carrying uplink S1AP signaling of a terminal, transmitted by a small cell, determining an operator network corresponding to the terminal based upon an S1AP ID carried in the uplink S1AP signaling, and transmitting the SCTP message carrying the uplink S1AP signaling to an He-GW of the operator network; and receiving, by the smart edge device, an SCTP message, carrying downlink S1AP signaling of the terminal, transmitted by the He-GW of the operator network, determining the small cell corresponding to the terminal based upon an S1AP ID carried in the downlink S1AP signaling, and transmitting the SCTP message carrying the downlink S1AP signaling to the small cell.

Preferably, determining the operator network corresponding to the terminal based upon the S1AP ID carried in the uplink S1AP signaling includes: obtaining, by the smart edge device, operator information corresponding to the terminal based upon an SCTP message, carrying first uplink S1AP signaling of the terminal, transmitted by the small cell, wherein the first uplink S1AP signaling carries a first S1AP ID allocated for the terminal by the small cell, and the first S1AP ID carries information about an operator corresponding to the terminal.

Preferably, determining the operator network corresponding to the terminal based upon the S1AP ID carried in the uplink S1AP signaling, and transmitting the SCTP message carrying the uplink S1AP signaling to the He-GW of the operator network includes: creating, by the smart edge device, an S1AP ID mapping relationship according to the first S1AP ID, and transmitting the SCTP message carrying the uplink S1AP signaling to the He-GW of the operator network based upon the S1AP ID mapping relationship; and determining the small cell corresponding to the terminal based upon the S1AP ID carried in the downlink S1AP signaling, and transmitting the SCTP message carrying the downlink S1AP signaling to the small cell includes: adjusting, by the smart edge device, the S1AP ID mapping relationship according to the S1AP ID carried in the downlink S1AP signaling, determining the small cell corresponding to the terminal based upon the adjusted S1AP ID mapping relationship, and transmitting the SCTP message carrying the downlink S1AP signaling to the small cell.

Preferably, creating, by the smart edge device, the S1AP ID mapping relationship according to the first S1AP ID, and transmitting the SCTP message carrying the uplink S1AP signaling to the He-GW of the operator network based upon the S1AP ID mapping relationship includes: allocating, by the smart edge device, a second S1AP ID for the terminal, wherein the second S1AP ID is a unique identifier allocated for the terminal by the smart edge device in the small cell hosted by the smart edge device; creating, by the smart edge device, the S1AP ID mapping relationship based upon the first S1AP ID and the second S1AP ID; and transmitting, by the smart edge device, an SCTP message carrying second uplink S1AP signaling of the terminal to the He-GW of the operator network based upon the S1AP ID mapping relationship and the operator information, wherein the second uplink S1AP signaling carries the second S1AP ID.

Preferably, adjusting, by the smart edge device, the S1AP ID mapping relationship according to the S1AP ID carried in the downlink S1AP signaling, determining the small cell corresponding to the terminal based upon the adjusted S1AP ID mapping relationship, and transmitting the SCTP message carrying the downlink S1AP signaling to the small cell includes: receiving, by the smart edge device, an SCTP message carrying first downlink S1AP signaling of the terminal, wherein the SCTP message carrying the first downlink S1AP signaling is a message returned by the He-GW of the operator network based upon the SCTP message carrying the second uplink S1AP signaling, the first downlink S1AP signaling carries the second S1AP ID and a third S1AP ID, and the third S1AP ID is allocated for the terminal by the He-GW of the operator network; allocating, by the smart edge device, a fourth S1AP ID for the terminal; adjusting, by the smart edge device, the S1AP ID mapping relationship based upon the first S1AP ID, the second S1AP ID, the third S1AP ID, and the fourth S1AP ID; determining, by the smart edge device, the small cell corresponding to the terminal according to the second S1AP ID; and transmitting, by the smart edge device, an SCTP message carrying second downlink S1AP signaling of the terminal to the small cell based upon the adjusted S1AP ID mapping relationship, wherein the second downlink signaling carries the fourth S1AP ID and the first S1AP ID.

Preferably, receiving, by the smart edge device, the SCTP message, carrying the uplink S1AP signaling of the terminal, transmitted by the small cell, determining the operator network corresponding to the terminal based upon the S1AP ID carried in the uplink S1AP signaling, and transmitting the SCTP message carrying the uplink S1AP signaling to the He-GW of the operator network includes: receiving, by the smart edge device, the SCTP message, carrying the uplink S1AP signaling including the first S1AP ID and the fourth S1AP ID, transmitted by the small cell; and determining, by the smart edge device, the second S1AP ID and the third S1AP ID based upon the first S1AP ID and the S1AP ID mapping relationship, and transmitting the SCTP message carrying the uplink S1AP signaling including the second S1AP ID and the third S1AP ID to the He-GW of the operator network.

Preferably, receiving, by the smart edge device, the SCTP message, carrying the downlink S1AP signaling of the terminal, transmitted by the He-GW of the operator network, determining the small cell based upon the S1AP ID carried in the downlink S1AP signaling, and transmitting the SCTP message carrying the downlink S1AP signaling to the small cell includes: receiving, by the smart edge device, the SCTP message, carrying the downlink S1AP signaling including the second S1AP ID and the third S1AP ID, transmitted by the He-GW of the operator network; and determining, by the smart edge device, the first S1AP ID and the fourth S1AP ID based upon the second S1AP ID and the S1AP ID mapping relationship, and transmitting the SCTP message carrying the downlink S1AP signaling including the first S1AP ID and the fourth S1AP ID to the small cell.

The embodiments of the invention provide an apparatus for transmitting S1AP signaling, the apparatus including: a requesting unit configured to receive an SCTP message, carrying uplink S1AP signaling of a terminal, transmitted by a small cell, to determine an operator network corresponding to the terminal based upon an S1AP ID carried in the uplink S1AP signaling, and to transmit the SCTP message carrying the uplink S1AP signaling to an He-GW of the operator network; and a responding unit configured to receive an SCTP message, carrying downlink S1AP signaling of the terminal, transmitted by the He-GW of the operator network, to determine the small cell corresponding to the terminal based upon an S1AP ID carried in the downlink S1AP signaling, and to transmit the SCTP message carrying the downlink S1AP signaling to the small cell.

Preferably, the requesting unit is further configured to determine the operator network corresponding to the terminal based upon the S1AP ID carried in the uplink S1AP signaling by: obtaining operator information corresponding to the terminal based upon an SCTP message, carrying first uplink S1AP signaling of the terminal, transmitted by the small cell, wherein the first uplink S1AP signaling carries a first S1AP ID allocated for the terminal by the small cell, and the first S1AP ID carries information about an operator corresponding to the terminal.

Preferably, the requesting unit is further configured to determine the operator network corresponding to the terminal based upon the S1AP ID carried in the uplink S1AP signaling, and to transmit the SCTP message carrying the uplink S1AP signaling to the He-GW of the operator network by: creating an S1AP ID mapping relationship according to the first S1AP ID, and transmitting the SCTP message carrying the uplink S1AP signaling to the He-GW of the operator network based upon the S1AP ID mapping relationship; and the responding unit is further configured to determine the small cell corresponding to the terminal based upon the S1AP ID carried in the downlink S1AP signaling, and to transmit the SCTP message carrying the downlink S1AP signaling to the small cell by: adjusting the S1AP ID mapping relationship according to the S1AP ID carried in the downlink S1AP signaling, determining the small cell corresponding to the terminal based upon the adjusted S1AP ID mapping relationship, and transmitting the SCTP message carrying the downlink S1AP signaling to the small cell.

Preferably, the requesting unit is further configured to create the S1AP ID mapping relationship according to the first S1AP ID, and to transmit the SCTP message carrying the uplink S1AP signaling to the He-GW of the operator network based upon the S1AP ID mapping relationship by: allocating a second S1AP ID for the terminal, wherein the second S1AP ID is a unique identifier allocated for the terminal by a smart edge device in the small cell hosted by the smart edge device; creating the S1AP ID mapping relationship based upon the first S1AP ID and the second S1AP ID; and transmitting an SCTP message carrying second uplink S1AP signaling of the terminal to the He-GW of the operator network based upon the S1AP ID mapping relationship and the operator information, wherein the second uplink S1AP signaling carries the second S1AP.

Preferably, the requesting unit is further configured to adjust the S1AP ID mapping relationship according to the S1AP ID carried in the downlink S1AP signaling, to determine the small cell corresponding to the terminal based upon the adjusted S1AP ID mapping relationship, and to transmit the SCTP message carrying the downlink S1AP signaling to the small cell by: receiving an SCTP message carrying first downlink S1AP signaling of the terminal, wherein the SCTP message carrying the first downlink S1AP signaling is a message returned by the He-GW of the operator network based upon the SCTP message carrying the second uplink S1AP signaling, the first downlink S1AP signaling carries the second S1AP ID and a third S1AP ID, and the third S1AP ID is allocated for the terminal by the He-GW of the operator network; allocating a fourth S1AP ID for the terminal; adjusting the S1AP ID mapping relationship based upon the first S1AP ID, the second S1AP ID, the third S1AP ID, and the fourth S1AP ID; determining the small cell corresponding to the terminal according to the second S1AP ID; and transmitting an SCTP message carrying second downlink S1AP signaling of the terminal to the small cell based upon the adjusted S1AP mapping relationship, wherein the second downlink signaling carries the fourth S1AP ID and the first S1AP.

Preferably, the requesting unit is further configured to receive the SCTP message, carrying the uplink S1AP signaling of the terminal, transmitted by the small cell, to determine the operator network corresponding to the terminal based upon the S1AP ID carried in the uplink S1AP signaling, and to transmit the SCTP message carrying the uplink S1AP signaling to the He-GW of the operator network by: receiving the SCTP message, carrying the uplink S1AP signaling including the first S1AP ID and the fourth S1AP ID, transmitted by the small cell; and determining the second S1AP ID and the third S1AP ID based upon the first S1AP ID and the S1AP ID mapping relationship, and transmitting the SCTP message carrying the uplink S1AP signaling including the second S1AP ID and the third S1AP ID to the He-GW of the operator network.

Preferably, the responding unit is further configured to receive the SCTP message, carrying the downlink S1AP signaling of the terminal, transmitted by the He-GW of the operator network, to determine the small cell based upon the S1AP carried in the downlink S1AP signaling, and to transmit the SCTP message carrying the downlink S1AP signaling to the small cell by: receiving the SCTP message, carrying the downlink S1AP signaling including the second S1AP ID and the third S1AP ID, transmitted by the He-GW of the operator network; and determining the first S1AP ID and the fourth S1AP ID based upon the second S1AP ID and the S1AP ID mapping relationship, and transmitting the SCTP message carrying the downlink S1AP signaling including the first S1AP ID and the fourth S1AP ID to the small cell.

In the embodiments of the invention, the smart edge device receives the SCTP message, carrying the uplink S1AP signaling of the terminal, transmitted by the small cell, determines the operator network corresponding to the terminal based upon the S1AP ID carried in the uplink S1AP signaling, and transmits the SCTP message carrying the uplink S1AP signaling to the He-GW of the operator network; and the smart edge device receives the SCTP message, carrying the downlink S1AP signaling of the terminal, transmitted by the He-GW of the operator network, determines the small cell corresponding to the terminal based upon the S1AP ID carried in the downlink S1AP signaling, and transmits the SCTP message carrying the downlink S1AP signaling to the small cell. In this way, the small cell can access networks of a plurality of operators to provide terminals of the different operators with a network service.

DETAILED DESCRIPTION OF THE EMBODIMENTS

Figure 1:
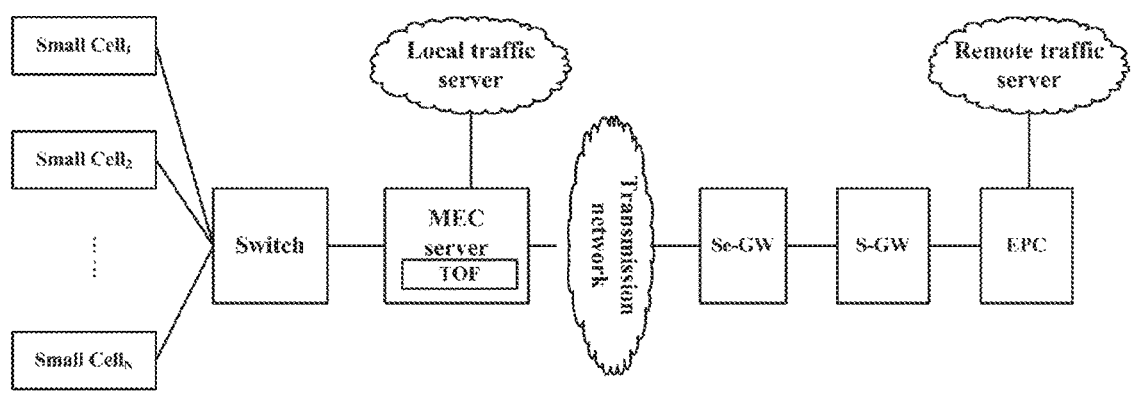
FIG. 1 is a network architectural diagram of small cells in the prior art.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described are only a part but not all of the embodiments of the invention. Based upon the embodiments here of the invention, all the other embodiments which can occur to those ordinarily skilled in the art without any inventive effort shall fall into the claimed scope of the invention.

It shall be appreciated that the technical solutions according to the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS) system, etc.

It shall be further appreciated in the embodiments of the invention, a User Equipment (UE) includes but will not be limited to a Mobile Station (MS), a mobile terminal, a mobile telephone, a handset, a portable equipment, etc., and the user equipment can communicate with one or more core networks over a Radio Access Network (RAN). For example, the user equipment can be a mobile phone (referred to as a "cellular" phone), a computer with a function of radio communication, etc., and the user equipment can also be a portable, pocket, handheld, built-in-computer, or on-vehicle mobile device.

In the embodiments of the invention, a base station (e.g., an access point) can be such a device in an access network that communicates with a radio terminal over one or more sectors via an air interface. The base station can be configured to convert a received air frame into an IP packet, and a received IP packet into an air frame, and operate as a router between the radio terminal and the remaining components of the access network, where the remaining components of the access network can include an Internet Protocol (IP) network. The base station can further coordinate attribute management on the air interface, and for example, the base station can be a Base Transceiver Station (BTS) in a GSM or CDMA system, or can be a NodeB in a WCDMA system, or can be an evolved base station (NodeB or eNB or e-NodeB) in an LIE system, although the invention will not be limited thereto.

In order to address the problem in the prior art that a small cell can only be accessed by a user of an operator thereof, but cannot be accessed by users of respective operators, in the embodiments of the invention, a smart edge device receives a Stream Control Transmission Protocol (SCTP) message, carrying uplink S1 Application Protocol (S1AP) signaling of a terminal, transmitted by a small cell, determines an operator network corresponding to the terminal based upon an S1AP Identifier (ID) carried in the uplink S1AP signaling, and transmits the SCTP message carrying the uplink S1AP signaling to an He-GW of the operator network; and the smart edge device receives an SCTP message, carrying downlink S1AP signaling of the terminal, transmitted by the He-GW of the operator network, determines the small cell corresponding to the terminal based upon the S1AP ID carried in the downlink S1AP signaling, and transmits the SCTP message carrying the downlink S1AP signaling to the small cell.

Figure 2:
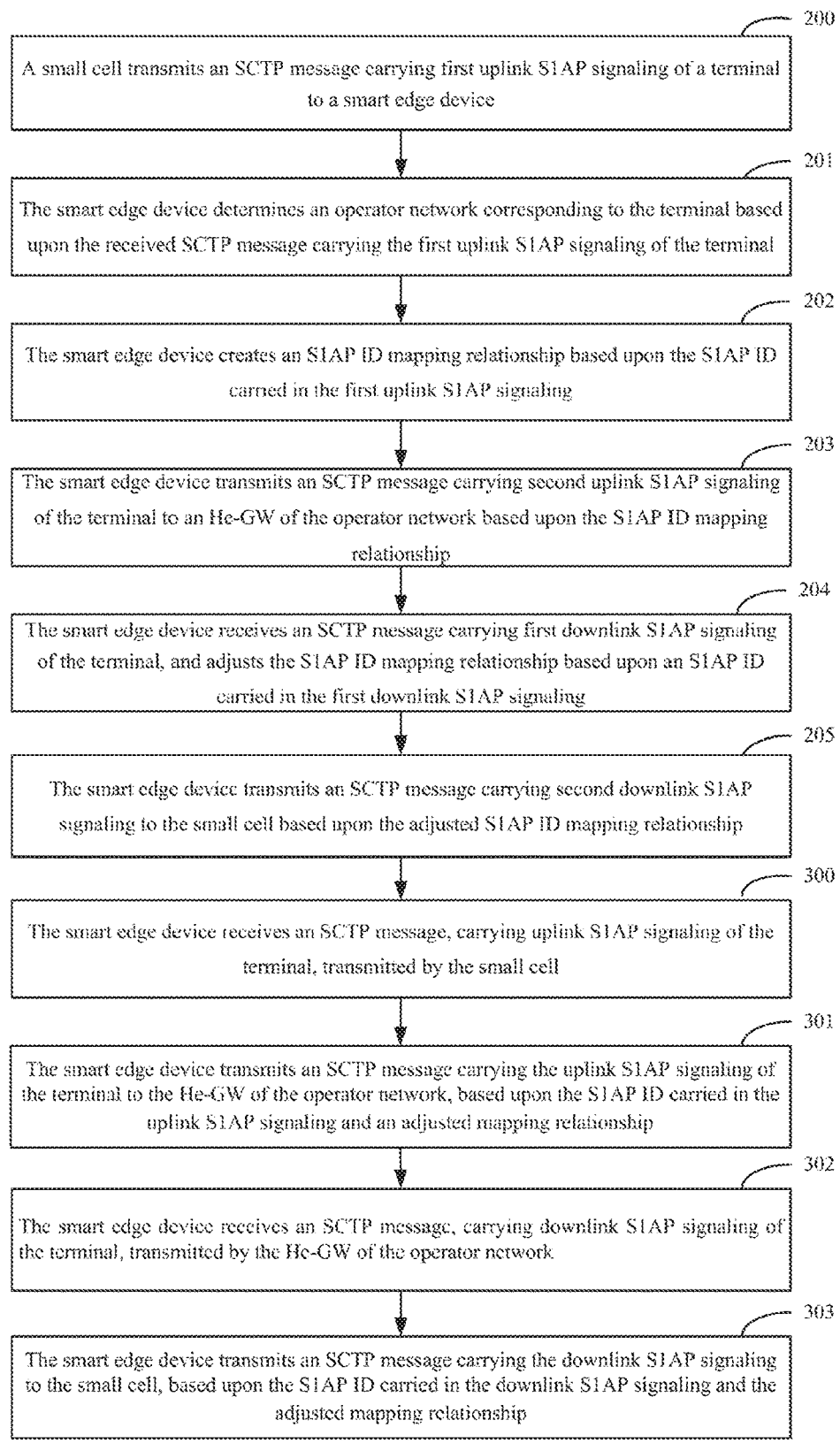
FIG. 2 is a flow chart of transmitting S1AP signaling according to the embodiments of the invention.

Referring to FIG. 2, a particular flow of a method for transmitting S1AP signaling according to the embodiments of the invention is as follows.

In the operation 200, a small cell transmits an SCTP message carrying first uplink S1AP signaling to a smart edge device.

In a real application, firstly the small cell allocates a first S1AP ID for a terminal, and adds information about an operator corresponding to the terminal to the first S1AP ID.

Optionally in this embodiment, the small cell supports all the frequency bands, and supports accesses thereto of terminals of a plurality of operators, and the small cell and the smart edge device allocates an S1AP ID according to agreed principles.

For example, the S1AP ID includes 28 bits in total as specified in the 3GPP protocol, and for example, accesses of at most eight operators are supported, and terminals of an operator can be identified using three bits.

Then the small cell transmits the SCTP message carrying the first uplink S1AP signaling of the terminal to the smart edge device, where the first uplink S1AP signaling carries the first S1AP ID.

In the operation 201, the smart edge device determines an operator network corresponding to the terminal based upon the received SCTP message carrying the first uplink S1AP signaling of the terminal.

The first S1AP ID carries the operator information, and the smart edge device obtains the operator information corresponding to the terminal based upon the first S1AP ID.

In the operation 202, the smart edge device creates an S1AP ID mapping relationship based upon the S1AP ID carried in the first uplink S1AP signaling.

Particularly, the smart edge device obtains the first S1AP ID based upon the S1AP ID carried in the first uplink S1AP signaling, and allocates a second S1AP ID for the terminal, where the second S1AP ID is a unique identifier allocated by the smart edge device for the terminal in the small cell hosted by the smart edge device.

Then the smart edge device creates the S1AP ID mapping relationship based upon the first S1AP ID and the second S1AP ID to couple the small cell with the smart edge device.

In the operation 203, the smart edge device transmits an SOT message carrying second uplink S1AP signaling of the terminal to an He-GW of the operator network based upon the S1AP ID mapping relationship.

Particularly, firstly the smart edge device obtains the first S1AP ID corresponding to the second S1AP ID based upon the mapping relationship, and obtains the operator information corresponding to the terminal based upon the first S1AP ID; and then the smart edge device transmits the SCTP message carrying the second uplink S1AP signaling of the terminal to the He-GW of the operator network corresponding to the terminal, where the second uplink S1AP signaling carries the second S1AP ID.

In the operation 204, the smart edge device receives an SCTP message carrying first downlink S1AP signaling of the terminal, and adjusts the S1AP ID mapping relationship based ilk upon an S1AP ID carried in the first downlink S1AP signaling.

Particularly, firstly the He-GW of the operator network receives the SCTP message carrying the second uplink S1AP signaling of the terminal, and allocates a third S1AP ID for the terminal; and then the He-GW of the operator network transmits the SCTP message carrying the first downlink S1AP signaling of the terminal to the smart edge device, based upon the received SCTP message carrying the second uplink S1AP signaling of the terminal, where the first downlink S1AP signaling carries the second S1AP ID and the third S1AP ID.

Furthermore, the smart edge device receives the SCTP message carrying the first downlink S1AP signaling of the terminal, and allocates a fourth S1AP ID for the terminal.

Finally, the smart edge device adjusts the mapping relationship based upon the first S1AP ID, the second S1AP ID, the third S1AP ID, and the fourth S1AP ID to create a routing relationship between terminals of different operators, and the small cell and the He-GW of the operator network.

In the operation 205, the smart edge device transmits an SCTP message carrying second downlink S1AP signaling to the small cell based upon the adjusted S1AP ID mapping relationship.

In a real application, the smart edge device obtain the first S1AP ID corresponding to the second S1AP ID based upon the adjusted S1AP ID mapping relationship, and determines the small cell corresponding to the terminal based upon the first S1AP ID.

Then, the smart edge device transmits the SCTP message carrying the second downlink S1AP signaling of the terminal to the small cell, where the second downlink S1AP signaling carries the first S1AP ID and the fourth SLAY ID.

At this point, a routing channel between the small cell and the He-GW of the operator network is laid out according to the adjusted S1AP ID mapping relationship, so that an SCTP message can be transmitted subsequently between the small cell and the He-GW of the operator network.

A particular process of transmitting an SCTP message subsequently between the small cell and the He-GW of the operator network based upon the mapping relationship will be described below.

In the operation 300, the smart edge device receives an SCTP message, carrying uplink S1AP signaling of the terminal, transmitted by the small cell.

Particularly, the small cell transmits the SCTP message, carrying the uplink S1AP signaling of the terminal including a first S1AP ID and a fourth S1AP ID, to the smart edge device.

Then the smart edge device receives the SCTP message, carrying the uplink S1AP ilk signaling of the terminal, transmitted by the small cell, and obtains operator information based upon the first S1AP ID.

In the operation 301, the smart edge device transmits an SCTP message carrying the uplink S1AP signaling of the terminal to the He-GW of the operator network, based upon the S1AP ID carried in the uplink S1AP signaling and an adjusted mapping relationship.

Particularly, the smart edge device obtains a second S1AP ID and a third S1AP If) based upon the first S1AP ID and an S1AP ID mapping relationship, and transmits an SCTP message, carrying the uplink S1AP signaling of the terminal including the second S1AP ID and the third S1AP ID, to the He-GW of the operator network.

For example, the small cell transmits an SCTP message carrying uplink S1AP signaling of a terminal a to an operator A in a real application particularly as follows.

Firstly, the small cell transmits an SCTP message, carrying uplink S1AP signaling of the terminal a including a first S1AP ID and a fourth S1AP ID, to the smart edge device.

Then, the smart edge device receives the SCTP message, carrying the uplink S1AP signaling, transmitted by the small cell, and determines an operator corresponding to the terminal a as the operator A based upon the first S1AP ID.

Finally, the smart edge device determines a second S1AP ID and a third S1AP ID based upon the first S1AP ID and an S1AP ID mapping relationship, and transmits an SCTP message, carrying the uplink S1AP signaling including the second S1AP ID and the third S1AP ID, to an He-GW of a network of the operator A.

In this way, the small cell transmits the SCTP message of the terminal a to the operator A in a message routing path of: the small cell->the smart edge device->an Se-GW of the operator A->the He-GW of the operator A->an EPC of the operator A.

In the operation 302, the smart edge device receives an SCTP message, carrying downlink S1AP signaling of the terminal, transmitted by the He-GW of the operator network.

Particularly, the He-GW of the operator network firstly transmits the SCTP message, carrying the downlink S1AP signaling including the second S1AP ID and the third S1AP ID, to the smart edge device.

Then, the smart edge device receives the SCTP message, carrying the downlink S1AP signaling, transmitted by the He-GW of the operator network.

In the operation 303, the smart edge device transmits an SCTP message carrying the downlink S1AP signaling to the small cell, based upon the S1AP ID carried in the downlink S1AP signaling and the adjusted mapping relationship.

Particularly, the smart edge device firstly determines the first S1AP ID, the fourth S1AP ID, and small cell information carried in the first S1AP ID based upon the second S1AP ilk ID and the S1AP ID mapping relationship.

Then, the smart edge device transmits the SCTP message, carrying the downlink S1AP signaling including the first SLAY ID and the fourth S1AP ID, to the small cell.

For example, the small cell receives an SCTP message, carrying downlink S1AP signaling of the terminal a, returned by the operator A in a real application particularly as follows.

Firstly, the He-GW of the network of the operator A transmits an SCTP message, carrying the downlink S1AP signaling including the second. S1AP ID and the third S1AP ID, to the smart edge device.

Then, the smart edge device receives the SCTP message, carrying the downlink SLAY signaling, transmitted by the He-GW of the network of the operator A, and obtains the first S1AP ID, the fourth S1AP ID, and the small cell information carried in the first S1AP ID based upon the second S1AP ID and the S1AP ID mapping relationship.

Finally, the smart edge device transmits an SCTP message, carrying the downlink S1AP signaling including the first S1AP ID and the fourth S1AP ID, to the small cell.

In this way, the small cell receives the SCTP message of the terminal a returned by the operator A in a message routing path of: the EPC of the operator A->the He-GW of the operator A->the Se-GW of the operator A->the smart edge device->the small cell.

The embodiment above will be described below in further details in connection with a particular application scenario.

For example, the small cell broadcasts system information including an operator B and an operator C. A User Equipment (UE) 1 selects a network of the operator B for an access, and a UE2 selects a network of the operator C for an access. Table 1 depicts an S1AP ID binding relationship stored in the small cell, the smart edge device, and the He-GW.

TABLE 1

The S1AP ID binding relationship stored in the small cell, the smart edge device, and the He-GW.

| | Coupling between the small cell and the smart edge device | | Coupling between the smart edge device and the He-GW | |
|---|---|---|---|---|
| | Small Cell | Smart edge device | Smart edge device | He-GW |
| UE1 | (S1AP ID11, S1AP ID12) | (S1AP ID11, S1AP ID12) | (S1AP ID13, S1AP ID14) | (S1AP ID13, S1AP ID14) |
| UE2 | (S1AP ID21, S1AP ID22) | (S1AP ID21, S1AP ID22) | (S1AP ID23, S1AP ID24) | (S1AP ID23, S1AP ID24) |

Operating flows will be described below taking the UE1 and the UE2 respectively as an example.

1) For an access of the UE1, the small cell allocates an S1AP ID11 for the UEL the smart edge device allocates an S1AP ID12 for the UE1, the He-GW of the operator B allocates an S1AP ID13 for the UE1, and the smart edge device allocates an S1AP ID14 for the UE1.

Firstly, the small cell transmits an SCTP message carrying first uplink signaling of the UE1 to the smart edge device, where the first uplink signaling carries the S1AP ID11.

Then, the smart edge device receives the SCTP message carrying the first uplink signaling of the UE1, and determines an operator corresponding to the UE1 as the operator B based upon operator information in the S1AP ID11.

Furthermore, the smart edge device creates an S1AP ID mapping relationship based upon the S1AP ID11 and the S1AP ID12, and transmits an SCTP message carrying second uplink S1AP signaling of the UE1 to the He-GW of the network of the operator B based upon the created S1AP ID mapping relationship, where the second uplink S1AP signaling carries the S1AP ID12.

Then, the He-GW of the network of the operator B receives the SCTP message of the UE1 carrying the second uplink SLAY signaling, and transmits an SCTP message carrying first downlink S1AP signaling to the smart edge device, where the first downlink SLAY signaling carries the S1AP ID12 and the S1AP ID13.

Furthermore, the smart edge device adjusts the mapping relationship based upon the S1AP ID11, the S1AP ID12, the S1AP ID13, and the S1AP ID14, and determines the small cell corresponding to the UE1 according to the S1AP ID12.

Then, the smart edge device transmits an SCTP message carrying second downlink S1AP signaling to the small cell based upon the adjusted mapping relationship, where the second downlink S1AP signaling carries the S1AP ID11 and the S1AP ID14.

At this point, a routing channel between the small cell and the He-GW of the network of the operator B is laid out according to the adjusted S1AP ID mapping relationship so that an SCTP message can be transmitted subsequently between the small cell, and the He-GW of the network of the operator B.

In this way, the small cell can access networks of a plurality of operators, and provide terminals of the different operators with a network service.

A particular process of transmitting an SCTP message between the small cell, and the He-GW of the network of the operator B will be described below in detail.

In order for the small cell to transmit an SCTP message carrying the UE1 to the He-GW of the network of the operator B, the small cell transmits an SCTP message carrying first uplink S1AP signaling of the UE1 to the smart edge device, where the first uplink S1AP signaling carries the S1AP ID11 and the S1AP ID14.

Then, the smart edge device receives the SCTP message, carrying the first uplink S1AP signaling of the UE1, transmitted by the small cell, and determines the S1AP ID12 and the S1AP ID13 based upon the S1AP ID11 and the adjusted mapping relationship.

Finally, the smart edge device transmits an SCTP message carrying second uplink S1AP signaling of the UE1 to the He-GW of the network of the operator B, where the second uplink S1AP signaling carries the S1AP ID12 and the S1AP ID13.

In order for the small cell to receive an SCTP message, carrying the UE1, returned by the He-GW of the network of the operator B, the He-GW of the network of the operator B firstly transmits an SCTP message carrying first downlink S1AP signaling of the UE1 to the smart edge device, where the first downlink S1AP signaling carries the S1AP ID12 and the S1AP ID13.

Then, the smart edge device receives the SCTP message, carrying the first downlink S1AP signaling of the UE1, transmitted by the He-GW of the network of the operator B, and determines the S1AP ID11 and the S1AP ID14, based upon the S1AP ID12 carried in the first downlink S1AP signaling and the adjusted mapping relationship.

Finally, the smart edge device transmits an SCTP message carrying second downlink S1AP signaling of the UE1 to the small cell based upon the adjusted mapping relationship, where the second downlink S1AP signaling carries the S1AP ID11 and the S1AP ID14.

In this way, the small cell receives the SCTP message returned by the He-GW of the network of the operator B.

2) For an access of the UE2, the small cell allocates an S1AP ID21 for the UE2, the smart edge device allocates an S1AP ID22 for the UE2, the He-GW of the operator C allocates an S1AP ID23 for the UE2, and the smart edge device allocates an S1AP ID24 for the UE2.

Firstly, the small cell transmits an SCTP message carrying first uplink signaling of the UE2 to the smart edge device, where the first uplink signaling carries the S1AP ID21.

Then, the smart edge device receives the SCTP message carrying the first uplink signaling of the UE2, and determines an operator corresponding to the UE2 as the operator C based upon operator information in the S1AP ID21.

Furthermore, the smart edge device creates an S1AP ID mapping relationship based upon the S1AP ID21 and the S1AP ID22, and transmits an SCTP message carrying second uplink S1AP signaling of the UE2 to the He-GW of the network of the operator C based upon the S1AP ID mapping relationship, where the second uplink S1AP signaling carries the S1AP ID22.

Then, the He-GW of the network of the operator C receives the SCTP message of the UE2 carrying the second uplink SLAY signaling, and transmits an SCTP message carrying first ilk downlink S1AP signaling to the smart edge device, where the first downlink S1AP signaling carries the S1AP ID22 and the S1AP ID23.

Finally, the smart edge device adjusts the mapping relationship based upon the S1AP ID21, the S1AP ID22, the S1AP ID23, and the S1AP ID24, and transmits an SCTP message carrying second downlink S1AP signaling according to the S1AP ID22 and the adjusted mapping relationship, where the second downlink S1AP signaling carries the S1AP ID21 and the S1AP ID24.

At this point, a routing channel between the small cell and the He-GW of the network of the operator C is laid out according to the adjusted S1AP ID mapping relationship so that an SCTP message can be transmitted subsequently between the small cell, and the He-GW of the network of the operator C.

In this way, the small cell can access networks of a plurality of operators, and provide terminals of the different operators with a network service.

A particular process of transmitting an SCTP message between the small cell, and the He-GW of the network of the operator C will be described below in detail.

In order for the small cell to transmit an SCTP message carrying the UE2 to the He-GW of the network of the operator C, the small cell transmits an SCTP message carrying first uplink S1AP signaling of the UE2 to the smart edge device, where the first uplink S1AP signaling carries the S1AP ID21 and the S1AP ID24.

Then the smart edge device receives the SCTP message, carrying the first uplink S1AP signaling of the UE2, transmitted by the small cell, and determines the S1AP ID22 and the S1AP ID23 based upon the S1AP ID21 and the adjusted mapping relationship.

Finally, the smart edge device transmits an SCTP message carrying second uplink S1AP signaling of the UE2 to the He-GW of the network of the operator C, where the second uplink S1AP signaling carries the S1AP ID22 and the S1AP ID23.

In this way, the small cell transmits the SCTP message to the He-GW of the network of the operator C according to the adjusted mapping relationship.

In order for the small cell to receive an SCTP message, carrying the UE2, returned by the He-GW of the network of the operator C, the He-GW of the network of the operator C firstly transmits an SCTP message carrying first downlink S1AP signaling of the UE2 to the smart edge device, where the first downlink S1AP signaling carries the S1AP ID22 and the S1AP ID23.

Then the smart edge device receives the SCTP message, carrying the first downlink S1AP signaling, transmitted by the He-GW of the network of the operator C, and determines the S1AP ID21 and the S1AP ID24 based upon the S1AP ID22 carried in the first downlink S1AP ilk signaling, and the adjusted mapping relationship.

Finally, the smart edge device transmits an SCTP message carrying second downlink S1AP signaling of the UE2 to the small cell based upon the adjusted mapping relationship, where the second downlink S1AP signaling carries the S1AP ID21 and the S1AP ID24.

In this way, the small cell receives the SCTP message returned by the He-GW of the network of the operator C according to the adjusted mapping relationship.

The embodiments above will be described below in further details in connection with a particular application scenario.

Figure 3:
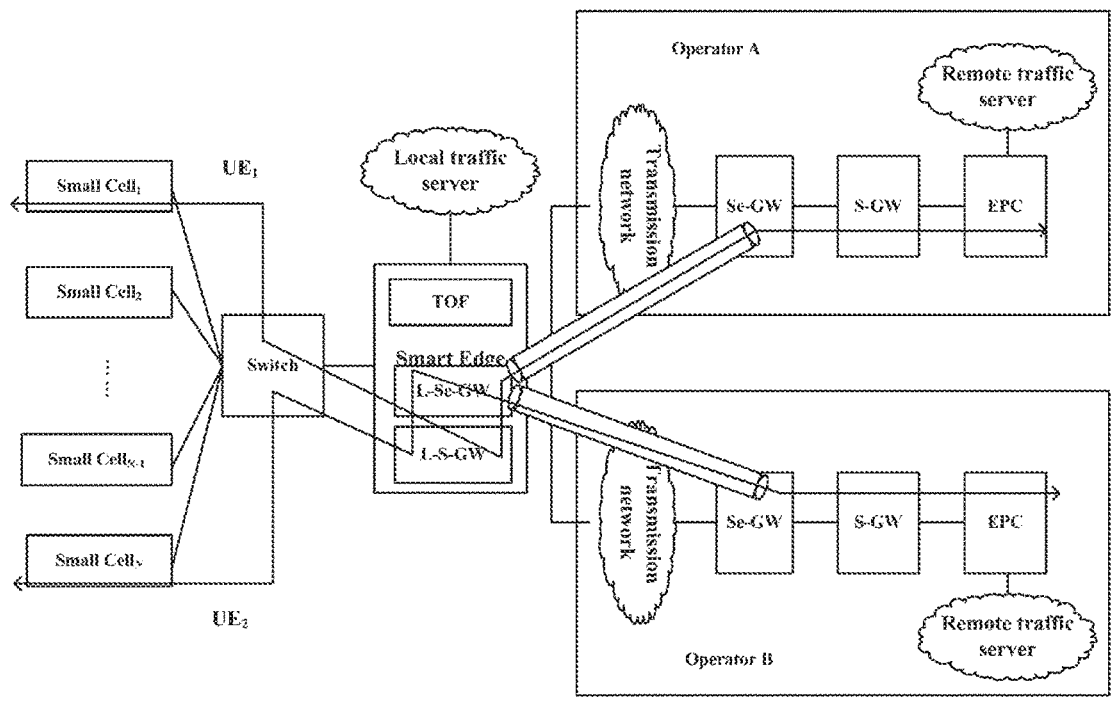
FIG. 3 is a network architectural diagram of transmitting S1AP signaling according to the embodiments of the invention.

FIG. 3 illustrates a network architectural diagram of transmitting S1AP signaling according to the embodiments of the invention.

In a real application, a Local Security Gateway (L-Se-GW) is deployed on the smart edge device to provide terminals of a plurality of operators with a network service.

For example, there are two operators including an operator A and an operator B, and n small cells including a small cell 1, a small cell N, etc., in the embodiments of the invention.

Here the small cells support all the frequency bands, and support accesses thereto of terminals of the plurality of operators.

The L-Se-GW of the smart edge device sets up IPSec tunnels with both an Se-GW of the operator A, and an Se-GW of the operator B, where the IPSec tunnels run through transmission networks of respective operators.

The smart edge device is SCTP-coupled with both an He-GW of the operator A, and an He-GW of the operator B, and messages on the SCTP couplings are borne over the IPSec tunnels. All the Se-GWs of the respective operators allocate for the smart edge device signaling IP addresses for accessing core networks of the respective operators.

A Local Signaling Gateway (L-S-GW) of the smart, edge device is SCTP-coupled with each small cell base station, and the L-S-GW of the smart edge device converges signaling of the base stations, and thereafter transmits the signaling to the core networks of the operators over the IPSec tunnels which are set up between the L-Se-GW of the smart edge device, and the Se-GWs of the respective operators. The L-Se-GW of the smart edge device allocates a, signaling IP address for each small cell, where each small cell supports concurrent operating in licensed frequency bands of the operator A and the operator B.

For uplink transmission, the smart edge device receives an SCTP message, carrying uplink S1AP signaling of a terminal, transmitted by a small cell, and transmits the SCTP message carrying the uplink S1AP signaling to an He-GW of an operator network corresponding to the terminal based upon a first S1AP ID allocated by the small cell, and a mapping relationship; and the smart edge device replaces a source IP address in an IP packet of ilk the SCTP message carrying the uplink S1AP signaling of the terminal with a signaling IP address allocated for the smart edge device by the operator network corresponding to the terminal.

For downlink transmission, an He-GW of an operator network transmits an SCTP message carrying downlink S1AP signaling of a terminal to the smart edge device based upon a received SCTP message carrying uplink S1AP signaling of the terminal; and the smart edge device determines a first S1AP ID allocated by a small cell based upon a third S1AP ID carried in the downlink S1AP signaling, and a mapping relationship, and since the ID includes information about the small cell, the smart edge device can transmit the SCTP message carrying the downlink S1AP signaling of the terminal to the small cell.

The smart edge device replaces a destination IP address in an IP packet of the SCTP message carrying the downlink S1AP signaling of the terminal with a signaling IP address of the small cell corresponding to the terminal.

Figure 4:
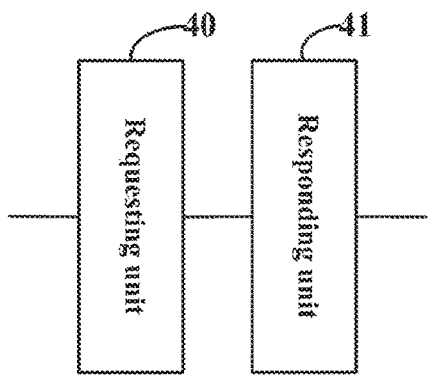
FIG. 4 is a schematic structural diagram of an apparatus for transmitting S1AP signaling according to the embodiments of the invention.

Based upon the embodiments above, as illustrated in FIG. 4, an apparatus for transmitting S1AP signaling according to the embodiments of the invention particularly includes following components.

A requesting unit 40 is configured to receive an SCTP message, carrying uplink S1AP signaling of a terminal, transmitted by a, small cell, to determine an operator network corresponding to the terminal based upon an S1 Access Point Identifier (S1AP ID) carried in the uplink S1AP signaling, and to transmit the SCTP message carrying the uplink S1AP signaling to an He-GW of the operator network.

A responding unit 41 is configured to receive an SCTP message, carrying downlink S1AP signaling of the terminal, transmitted by the He-GW of the operator network, to determine the small cell corresponding to the terminal based upon an S1AP ID carried in the downlink S1AP signaling, and to transmit the SCTP message carrying the downlink S1AP signaling to the small cell.

Preferably, the requesting unit 40 is configured to determine the operator network corresponding to the terminal based upon the S1AP ID carried in the uplink S1AP signaling by: obtaining operator information corresponding to the terminal based upon an SC IP message, carrying first uplink S1AP signaling of the terminal, transmitted by the small cell, where the first uplink S1AP signaling carries a first S1AP ID allocated for the terminal by the small cell, and the first S1AP carries information about an operator corresponding to the terminal.

Preferably, the requesting unit 40 is configured to determine the operator network corresponding to the terminal based upon the S1AP ID carried in the uplink S1AP signaling, and to transmit the SCTP message carrying the uplink S1AP signaling to the He-GW of the operator network by: creating an S1AP ID mapping relationship according to the first S1AP ID, and transmitting the SCTP message carrying the uplink S1AP signaling to the He-GW of the operator network based upon the S1AP ID mapping relationship.

And the responding unit 41 is configured to determine the small cell corresponding to the terminal based upon the S1AP ID carried in the downlink S1AP signaling, and to transmit the SCTP message carrying the downlink S1AP signaling to the small cell by: adjusting the S1AP ID mapping relationship according to the S1AP ID carried in the downlink S1AP signaling, determining the small cell corresponding to the terminal based upon the adjusted S1AP ID mapping relationship, and transmitting the SCTP message carrying the downlink S1AP signaling to the small cell.

Preferably, the requesting unit 40 is configured to create the S1AP ID mapping relationship according to the first S1AP ID, and to transmit the SCTP message carrying the uplink S1AP signaling to the He-GW of the operator network based upon the S1AP ID mapping relationship by: allocating a second S1AP ID for the terminal, where the second S1AP ID is a unique identifier allocated by a smart edge device in the small cell hosted by the smart edge device; creating the S1AP ID mapping relationship based upon the first S1AP ID and the second S1AP ID; and transmitting an SCTP message carrying second uplink S1AP signaling of the terminal to the He-GW of the operator network based upon the S1AP ID mapping relationship and the operator information, where the second uplink S1AP signaling carries the second. S1AP ID.

Preferably, the requesting unit 40 is configured to adjust the S1AP ID mapping relationship according to the S1AP ID carried in the downlink S1AP signaling, to determine the small cell corresponding to the terminal based upon the adjusted S1AP ID mapping relationship, and to transmit the SCTP message carrying the downlink S1AP signaling to the small cell by: receiving an SCTP message carrying first downlink S1AP signaling of the terminal, where the SCTP message carrying the first downlink S1AP signaling is a message returned by the He-GW of the operator network based upon the SCTP message carrying the second uplink S1AP signaling, the first downlink S1AP signaling carries the second S1AP ID and a third S1AP ID, and the third S1AP ID is allocated for the terminal by the He-GW of the operator network; allocating a fourth S1AP ID for the terminal; adjusting the mapping relationship based upon the first S1AP ID, the second S1AP ID, the third S1AP ID, and the fourth S1AP ID; determining the small cell corresponding to the terminal according to the second S1AP ID; and transmitting an SCTP message carrying second downlink S1AP signaling of the terminal to the small cell based upon the adjusted mapping relationship, where the second downlink S1AP signaling carries the fourth S1AP ID and the first S1AP ID.

Preferably, the requesting unit 40 is configured to receive the SCTP message, carrying the uplink S1AP signaling of the terminal, transmitted by the small cell, to determine the operator network corresponding to the terminal based upon the S LAP ID carried in the uplink S1AP signaling, and to transmit the SCTP message carrying the uplink S1AP signaling to the He-GW of the operator network by: receiving the SCTP message, carrying the uplink S1AP signaling including the first S1AP ID and the fourth S1AP ID, transmitted by the small cell; and determining the second S1AP ID and the third S1AP ID based upon the first S1AP ID and the S1AP ID mapping relationship, and transmitting the SCTP message carrying the uplink S1AP signaling including the second S1AP ID and the third S1AP ID to the He-GW of the operator network.

Preferably, the responding unit 41 is configured to receive the SCTP message, carrying the downlink S1AP signaling of the terminal, transmitted by the He-GW of the operator network, to determine the small cell based upon the S1AP ID carried in the downlink S1AP signaling, and to transmit the SCTP message carrying the downlink S1AP signaling to the small cell by: receiving the SCTP message, carrying the downlink S1AP signaling including the second. S1AP ID and the third. S1AP ID, transmitted by the He-GW of the operator network; and determining the first S1AP ID and the fourth S1AP ID based upon the second S1AP ID and the S1AP ID mapping relationship, and transmitting the SCTP message carrying the downlink S1AP signaling including the first S1AP ID and the fourth S1AP ID to the small cell.

In summary, in the embodiments of the invention, the smart edge device receives the SCTP message, carrying the uplink S1AP signaling of the terminal, transmitted by the small cell, determines the operator network corresponding to the terminal based upon the S1AP ID carried in the uplink S1AP signaling, and transmits the SCTP message carrying the uplink S1AP signaling to the He-GW of the operator network; and the smart edge device receives the SCTP message, carrying the downlink S1AP signaling of the terminal, transmitted by the He-GW of the operator network, determines the small cell corresponding to the terminal based upon the S1AP ID carried in the downlink S1AP signaling, and transmits the SCTP message carrying the downlink S1AP signaling to the small cell. In this way, the small cell can access networks of a plurality of operators to provide terminals of the different operators with a network service.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the blocks) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coining into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting S1 Application Protocol (S1AP) signaling, the method comprising:
receiving, by a smart edge device, a Stream Control Transmission Protocol (SCTP) message, carrying uplink S1AP signaling of a terminal, transmitted by a small cell, determining an operator network corresponding to the terminal based upon an S1 Access Point Identifier (S1AP ID) carried in the uplink S1AP signaling, and transmitting the SCTP message carrying the uplink S1AP signaling to a signaling gateway (He-GW) of the operator network; and
receiving, by the smart edge device, an SCTP message, carrying downlink S1AP signaling of the terminal, transmitted by the He-GW of the operator network, determining the small cell corresponding to the terminal based upon an S1AP ID carried in the downlink S1AP signaling, and transmitting the SCTP message carrying the downlink S1AP signaling to the small cell.

2. The method according to claim 1, wherein determining the operator network corresponding to the terminal based upon the S1AP ID carried in the uplink S1AP signaling comprises:

obtaining, by the smart edge device, operator information corresponding to the terminal based upon an SCTP message, carrying first uplink S1AP signaling of the terminal, transmitted by the small cell, wherein the first uplink S1AP signaling carries a first S1AP ID allocated for the terminal by the small cell, and the first S1AP ID carries information about an operator corresponding to the terminal.

3. The method according to claim 2, wherein determining the operator network corresponding to the terminal based upon the S1AP ID carried in the uplink S1AP signaling, and transmitting the SCTP message carrying the uplink S1AP signaling to the He-GW of the operator network comprises:

creating, by the smart edge device, an S1AP ID mapping relationship according to the first S1AP ID, and transmitting the SCTP message carrying the uplink S1AP signaling to the He-GW of the operator network based upon the S1AP ID mapping relationship; and determining the small cell corresponding to the terminal based upon the S1AP ID carried in the downlink S1AP signaling, and transmitting the SCTP message carrying the downlink S1AP signaling to the small cell comprises:

adjusting, by the smart edge device, the S1AP ID mapping relationship according to the S1AP ID carried in the downlink S1AP signaling, determining the small cell corresponding to the terminal based upon the adjusted S1AP ID mapping relationship, and transmitting the SCTP message carrying the downlink S1AP signaling to the small cell.

4. The method according to claim 3, wherein creating, by the smart edge device, the S1AP ID mapping relationship according to the first S1AP ID, and transmitting the SCTP message carrying the uplink S1AP signaling to the He-GW of the operator network based upon the S1AP ID mapping relationship comprises:

allocating, by the smart edge device, a second S1AP ID for the terminal, wherein the second S1AP ID is a unique identifier allocated for the terminal by the smart edge device in the small cell hosted by the smart edge device;

creating, by the smart edge device, the S1AP ID mapping relationship based upon the first S1AP ID and the second S1AP ID; and transmitting, by the smart edge device, an SCTP message carrying second uplink S1AP signaling of the terminal to the He-GW of the operator network based upon the S1AP ID mapping relationship and the operator information, wherein the second uplink S1AP signaling carries the second S1AP ID.

5. The method according to claim 4, wherein adjusting, by the smart edge device, the S1AP ID mapping relationship according to the S1AP ID carried in the downlink S1AP signaling, determining the small cell corresponding to the terminal based upon the adjusted S1AP ID mapping relationship, and transmitting the SCTP message carrying the downlink S1AP signaling to the small cell comprises:

receiving, by the smart edge device, an SCTP message carrying first downlink S1AP signaling of the terminal, wherein the SCTP message carrying the first downlink S1AP signaling is a message returned by the He-GW of the operator network based upon the SCTP message carrying the second uplink S1AP signaling, the first downlink S1AP signaling carries the second S1AP ID and a third S1AP ID, and the third S1AP ID is allocated for the terminal by the He-GW of the operator network;

allocating, by the smart edge device, a fourth S1AP ID for the terminal;

adjusting, by the smart edge device, the S1AP ID mapping relationship based upon the first S1AP ID, the second S1AP ID, the third S1AP ID, and the fourth S1AP ID;

determining, by the smart edge device, the small cell corresponding to the terminal according to the second S1AP ID; and transmitting, by the smart edge device, an SCTP message carrying second downlink S1AP signaling of the terminal to the small cell based upon the adjusted S1AP ID mapping relationship, wherein the second downlink signaling carries the fourth S1AP ID and the first S1AP ID.

6. The method according to claim 5, wherein receiving, by the smart edge device, the SCTP message, carrying the uplink S1AP signaling of the terminal, transmitted by the small cell, determining the operator network corresponding to the terminal based upon the S1AP ID carried in the uplink S1AP signaling, and transmitting the SCTP message carrying the uplink S1AP signaling to the He-GW of the operator network comprises:

receiving, by the smart edge device, the SCTP message, carrying the uplink S1AP signaling comprising the first S1AP ID and the fourth S1AP ID, transmitted by the small cell; and determining, by the smart edge device, the second S1AP ID and the third S1AP ID based upon the first S1AP ID and the S1AP ID mapping relationship, and transmitting the SCTP message carrying the uplink S1AP signaling comprising the second S1AP ID and the third S1AP ID to the He-GW of the operator network.

7. The method according to claim 6, wherein receiving, by the smart edge device, the SCTP message, carrying the downlink S1AP signaling of the terminal, transmitted by the He-GW of the operator network, determining the small cell based upon the S1AP ID carried in the downlink S1AP signaling, and transmitting the SCTP message carrying the downlink S1AP signaling to the small cell comprises:

receiving, by the smart edge device, the SCTP message, carrying the downlink S1AP signaling comprising the second S1AP ID and the third S1AP ID, transmitted by the He-GW of the operator network; and determining, by the smart edge device, the first S1AP ID and the fourth S1AP ID based upon the second S1AP ID and the S1AP ID mapping relationship, and transmitting the SCTP message carrying the downlink S1AP signaling comprising the first S1AP ID and the fourth S1AP ID to the small cell.

8. The method according to claim 5, wherein receiving, by the smart edge device, the SCTP message, carrying the downlink S1AP signaling of the terminal, transmitted by the He-GW of the operator network, determining the small cell based upon the S1AP ID carried in the downlink S1AP signaling, and transmitting the SCTP message carrying the downlink S1AP signaling to the small cell comprises:

receiving, by the smart edge device, the SCTP message, carrying the downlink S1AP signaling comprising the second S1AP ID and the third S1AP ID, transmitted by the He-GW of the operator network; and determining, by the smart edge device, the first S1AP ID and the fourth S1AP ID based upon the second S1AP ID and the S1AP ID mapping relationship, and transmitting the SCTP message carrying the downlink S1AP signaling comprising the first S1AP ID and the fourth S1AP ID to the small cell.

9. An apparatus for transmitting S1Application Protocol (S1AP) signaling, the apparatus comprising:
   a requesting unit configured to receive an SCTP message, carrying uplink S1AP signaling of a terminal, transmitted by a small cell, to determine an operator network corresponding to the terminal based upon an S1Access Point Identifier (S1AP ID) carried in the uplink S1AP signaling, and to transmit the SCTP message carrying the uplink S1AP signaling to an He-GW of the operator network; and
   a responding unit configured to receive an SCTP message, carrying downlink S1AP signaling of the terminal, transmitted by the He-GW of the operator network, to determine the small cell corresponding to the terminal based upon an S1AP ID carried in the downlink S1AP signaling, and to transmit the SCTP message carrying the downlink S1AP signaling to the small cell.

10. The apparatus according to claim 9, wherein the requesting unit is further configured to determine the operator network corresponding to the terminal based upon the S1AP ID carried in the uplink S1AP signaling by:
    obtaining operator information corresponding to the terminal based upon an SCTP message, carrying first uplink S1AP signaling of the terminal, transmitted by the small cell, wherein the first uplink S1AP signaling carries a first S1AP ID allocated for the terminal by the small cell, and the first S1AP ID carries information about an operator corresponding to the terminal.

11. The apparatus according to claim 10, wherein the requesting unit is further configured to determine the operator network corresponding to the terminal based upon the S1AP ID carried in the uplink S1AP signaling, and to transmit the SCTP message carrying the uplink S1AP signaling to the He-GW of the operator network by:
    creating an S1AP ID mapping relationship according to the first S1AP ID, and transmitting the SCTP message carrying the uplink S1AP signaling to the He-GW of the operator network based upon the S1AP ID mapping relationship; and
    the responding unit is further configured to determine the small cell corresponding to the terminal based upon the S1AP ID carried in the downlink S1AP signaling, and to transmit the SCTP message carrying the downlink S1AP signaling to the small cell by:
    adjusting the S1AP ID mapping relationship according to the S1AP ID carried in the downlink S1AP signaling, determining the small cell corresponding to the terminal based upon the adjusted S1AP ID mapping relationship, and transmitting the SCTP message carrying the downlink S1AP signaling to the small cell.

12. The apparatus according to claim 11, wherein the requesting unit is further configured to create the S1AP ID mapping relationship according to the first S1AP ID, and to transmit the SCTP message carrying the uplink S1AP signaling to the He-GW of the operator network based upon the S1AP ID mapping relationship by:
    allocating a second S1AP ID for the terminal, wherein the second S1AP ID is a unique identifier allocated for the terminal by a smart edge device in the small cell hosted by the smart edge device;
    creating the S1AP ID mapping relationship based upon the first S1AP ID and the second S1AP ID; and
    transmitting an SCTP message carrying second uplink S1AP signaling of the terminal to the He-GW of the operator network based upon the S1AP ID mapping relationship and the operator information, wherein the second uplink S1AP signaling carries the second S1AP ID.

13. The apparatus according to claim 12, wherein the requesting unit is further configured to adjust the S1AP ID mapping relationship according to the S1AP ID carried in the downlink S1AP signaling, to determine the small cell corresponding to the terminal based upon the adjusted S1AP ID mapping relationship, and to transmit the SCTP message carrying the downlink S1AP signaling to the small cell by:
    receiving an SCTP message carrying first downlink S1AP signaling of the terminal, wherein the SCTP message carrying the first downlink S1AP signaling is a message returned by the He-GW of the operator network based upon the SCTP message carrying the second uplink S1AP signaling, the first downlink S1AP signaling carries the second S1AP ID and a third S1AP ID, and the third S1AP ID is allocated for the terminal by the He-GW of the operator network;
    allocating a fourth S1AP ID for the terminal;
    adjusting the S1AP ID mapping relationship based upon the first S1AP ID, the second S1AP ID, the third S1AP ID, and the fourth S1AP ID;
    determining the small cell corresponding to the terminal according to the second S1AP ID; and
    transmitting an SCTP message carrying second downlink S1AP signaling of the terminal to the small cell based upon the adjusted S1AP ID mapping relationship, wherein the second downlink signaling carries the fourth S1AP ID and the first S1AP ID.

14. The apparatus according to claim 13, wherein the requesting unit is further configured to receive the SCTP message, carrying the uplink S1AP signaling of the terminal, transmitted by the small cell, to determine the operator network corresponding to the terminal based upon the S1AP ID carried in the uplink S1AP signaling, and to transmit the SCTP message carrying the uplink S1AP signaling to the He-GW of the operator network by:
    receiving the SCTP message, carrying the uplink S1AP signaling comprising the first S1AP ID and the fourth S1AP ID, transmitted by the small cell; and
    determining the second S1AP ID and the third S1AP ID based upon the first S1AP ID and the S1AP ID mapping relationship, and transmitting the SCTP message carrying the uplink S1AP signaling comprising the second S1AP ID and the third S1AP ID to the He-GW of the operator network.

15. The apparatus according to claim 14, wherein the responding unit is further configured to receive the SCTP message, carrying the downlink S1AP signaling of the terminal, transmitted by the He-GW of the operator network, to determine the small cell based upon the S1AP ID carried in the downlink S1AP signaling, and to transmit the SCTP message carrying the downlink S1AP signaling to the small cell by:
    receiving the SCTP message, carrying the downlink S1AP signaling comprising the second S1AP ID and the third S1AP ID, transmitted by the He-GW of the operator network; and
    determining the first S1AP ID and the fourth S1AP ID based upon the second S1AP ID and the S1AP ID mapping relationship, and transmitting the SCTP message carrying the downlink S1AP signaling comprising the first S1AP ID and the fourth S1AP ID to the small cell.

16. The apparatus according to claim 13, wherein the responding unit is further configured to receive the SCTP message, carrying the downlink S1AP signaling of the terminal, transmitted by the He-GW of the operator network, to determine the small cell based upon the S1AP ID carried in the downlink S1AP signaling, and to transmit the SCTP message carrying the downlink S1AP signaling to the small cell by:

receiving the SCTP message, carrying the downlink S1AP signaling comprising the second S1AP ID and the third S1AP ID, transmitted by the He-GW of the operator network; and determining the first S1AP ID and the fourth S1AP ID based upon the second S1AP ID and the S1AP ID mapping relationship, and transmitting the SCTP message carrying the downlink S1AP signaling comprising the first S1AP ID and the fourth S1AP ID to the small cell.

* * * * *